United States Patent
Brunneke (10) Patent No.: US 9,328,749 B2
(45) Date of Patent: May 3, 2016

(54) BRACKET-LESS CLAMPING ASSEMBLY

(75) Inventor: Hans-Gerd Brunneke, Georgsmarienhutte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 171 days.

(21) Appl. No.: 13/816,957

(22) PCT Filed: Jul. 25, 2011

(86) PCT No.: PCT/EP2011/062729
§ 371 (c)(1),
(2), (4) Date: Feb. 14, 2013

(87) PCT Pub. No.: WO2012/031822
PCT Pub. Date: Mar. 15, 2012

(65) Prior Publication Data
US 2013/0156498 A1    Jun. 20, 2013

(30) Foreign Application Priority Data
Sep. 8, 2010 (DE) .......................... 10 2010 040 419

(51) Int. Cl.
*B60G 7/00* (2006.01)
*B62D 7/20* (2006.01)
(Continued)

(52) U.S. Cl.
CPC ................ *F16B 2/065* (2013.01); *B60G 7/001* (2013.01); *B60G 7/005* (2013.01); *B62D 7/20* (2013.01); *F16B 7/182* (2013.01); *F16C 7/06* (2013.01);
(Continued)

(58) Field of Classification Search
CPC .. B60G 7/001; B60G 7/005; B60G 2204/416; B60G 2206/1112; B62D 7/20; F16B 2/065; F16B 7/185; F16B 7/182; F16C 7/06
USPC ........ 403/77, 200, 310, 314, 370, 371, 374.4, 403/311, 367–369, 374.3
See application file for complete search history.

(56) References Cited

U.S. PATENT DOCUMENTS 904,341 A * 11/1908 Lindstrom .................... 403/314
1,854,925 A * 4/1932 Crawford ........................ 403/77
(Continued)

FOREIGN PATENT DOCUMENTS

BE          39 37 95 C     4/1924
CN          1037385 A      11/1989
(Continued)

OTHER PUBLICATIONS

"Frequently Asked Questions." RaceBolt. Aug. 30, 2009, [online], [retrieved on May 19, 2015] Retrieved from the Internet <URL: https://web.archive.org/web/20090830202939/http://www.racebolt.com/faq.htm>.*

(Continued)

*Primary Examiner* — Josh Skroupa
(74) *Attorney, Agent, or Firm* — Davis & Bujold, P.L.L.C.; Michael J. Bujold (57) ABSTRACT

A clamping assembly for a strut element. The clamping assembly connects one end of the substantially tubular strut to a threaded bolt. The clamping assembly comprises a threaded sleeve that is arranged in the tubular strut in a radial annular gap between the threaded bolt and the inside cross-section of the strut, in a conical internal thread of the strut. The threaded sleeve has a conical external thread and an internal thread that receives the threaded bolt. The end of the sleeve, that is received by the strut, is radially elastic.

20 Claims, 4 Drawing Sheets

(51) Int. Cl.
*F16B 2/06* (2006.01)
*F16B 7/18* (2006.01)
*F16C 7/06* (2006.01)

(52) U.S. Cl.
CPC ... *B60G 2204/416* (2013.01); *B60G 2206/1112* (2013.01); *Y10T 403/32204* (2015.01); *Y10T 403/7056* (2015.01); *Y10T 403/7058* (2015.01); *Y10T 403/7069* (2015.01)

(56) References Cited

U.S. PATENT DOCUMENTS

| | | | | |
|---|---|---|---|---|
| 2,437,843 | A | * | 3/1948 | Van Ness ............... 403/223 |
| 3,023,821 | A | | 3/1962 | Etherington |
| 4,623,277 | A | * | 11/1986 | Wayne et al. ............ 403/314 |
| 5,131,204 | A | * | 7/1992 | Hiendl ..................... 403/307 |
| 5,193,932 | A | * | 3/1993 | Wu ........................... 403/314 |
| 5,286,133 | A | | 2/1994 | Wood |
| 6,074,125 | A | * | 6/2000 | Krawczak ............... 403/374.3 |
| 6,302,614 | B1 | | 10/2001 | Tseng |
| 7,357,589 | B2 | * | 4/2008 | Mouro ..................... 403/371 |
| 7,507,048 | B2 | * | 3/2009 | Colarusso et al. ....... 403/286 |
| 8,220,842 | B2 | * | 7/2012 | Roussie et al. ........... 285/333 |
| 8,449,235 | B2 | * | 5/2013 | Hettich et al. ........... 411/178 |
| 2005/0179186 | A1 | | 8/2005 | Genot et al. |
| 2010/0003074 | A1 | | 1/2010 | Kim |

FOREIGN PATENT DOCUMENTS

| | | | |
|---|---|---|---|
| DE | 77 32 250 | | 2/1978 |
| DE | 87 11 928 U1 | | 12/1987 |
| DE | 90 17 038 U1 | | 5/1991 |
| DE | 10 2007 054 798 | * 4/2009 | ............ B21D 53/24 |
| DE | 10 2008 040 671 A1 | | 4/2010 |
| EP | 1 553 310 A1 | | 7/2005 |
| JP | S6125826 U | | 2/1986 |
| JP | 2000 199507 A | | 7/2000 |
| JP | 2000199507 A | | 7/2000 |
| JP | 2003056540 A | | 2/2003 |
| JP | 2010513819 A | | 4/2010 |

OTHER PUBLICATIONS

Translation of JP 2000-199507. Saito, et al. Turn Buckle Joint and Tie Rod Using Turn Buckle Joint. Jul. 18, 2000.*
German Search Report Corresponding to DE 10 2010 040 419.5.
International Search Report Corresponding to PCT/EP2011/062729.
Written Opinion Corresponding to PCT/EP2011/062729.
Chinese Search Report issued in corresponding Chinese Patent Application No. 201180041805.5 mailed Oct. 21, 2014.
Japanese Office Action issued in corresponding Japanese Patent Application No. 2013-527514 mailed Jun. 3, 2015.

* cited by examiner

BRACKET-LESS CLAMPING ASSEMBLY

This application is a National Stage completion of PCT/EP2011/062729 filed Jul. 25, 2011, which claims priority from German patent application serial no. 10 2010 040 419.5 filed Sep. 8, 2010.

FIELD OF THE INVENTION

The invention concerns a clamping joint on a strut element for the coupling connection of assemblies or components, for example of chassis parts. The clamping joint comprises the end area of a tubular strut of a strut element, and a threaded bolt.

BACKGROUND OF THE INVENTION

Strut elements, by which various components or assemblies are connected to one another, are known from the prior art. These can be fixed struts such as frame struts or base supports, which are arranged essentially unmovably between components and thereby prevent relative movement of the components in relation to one another.

Also known from the prior art are movable strut elements such as coupling struts, hinged supports, chassis struts and steering or track rods, which in most cases are connected movably or articulated to the corresponding components or assemblies to be joined, for example in order to couple the joined components to one another with a degree of freedom of movement, or in order to control the position or the angular position of assemblies—such as wheel carriers on a motor vehicle.

Particularly in vehicle engineering severe demands are made on such strut elements, including in particular load-bearing capacity and fatigue strength, high security against failure and good corrosion resistance. At the same time such strut elements should take up as little space as possible in order to, as much as possible, avoid colliding with adjacent assemblies and so as not to restrict the freedom of movement of other components and assemblies, particularly in the chassis area. A general requirement for such strut elements is usually also length adjustability, which is usually achieved by making the strut in two parts with a threaded joint between them.

From the prior art steering and track rods, or in general strut elements are known, in which a usually tubular strut has an internal thread at one or both ends, which serves to receive a threaded bolt. In turn, the threaded bolt can be connected to components to be joined, for example to the ball head of a ball joint. To set the desired length of the strut element, for example to be able to adjust the wheel geometry or the steering angle in the motor vehicle, the threaded bolt is screwed into the thread of the tubular strut until the desired strut length is produced. To prevent play or autonomous displacement of the strut element, it is then necessary to fix the threaded bolt in the internal thread of the strut firmly and without any play.

In the prior art, this requirement is usually fulfilled by providing an axial slot in the end area of the strut that has the internal thread, and at the same time arranging on the outside of the strut in the area of the internal thread or the axial slot of the strut a clamping collar. By tightening the clamping collar/with the threaded bolt screwed in to the desired depth the strut, in the area of its internal thread, is compressed radially so that it firmly clamps the threaded bolt.

However, this method known from the prior art for fixing the threaded bolt of a strut element in the desired axial position has disadvantages. Thus, the necessary axial slotting of the threaded zone of the strut is, first of all, associated with considerable weakening of the end of the strut in relation to torsion, bending and buckling resistance. Furthermore, by virtue of the axial slot in the threaded zone, surfaces are created that are prone to corrosion, in that water or other corrosive media can make their way into the thread of the strut or the threaded bolt, or even penetrate to the inside of the strut. This can result in further weakening of the strut, or the internal strut thread and the threaded bolt can bind together due to corrosion, which can make it more difficult, later, to adjust or dismantle the strut element.

Moreover, the clamping collar needed for compressed the end of the strut in the threaded zone usually takes up considerable installation space, whereby the space required by the strut element in this area is often almost doubled. This can result in contact with adjacent components or assemblies, particularly since the angular position of the clamping collar in the threaded zone of the strut is usually not exactly defined or fixed. In principle, therefore, the clamping collar can extend out from the strut in any direction, and in turn this has to be taken into account during the design and interference checking of the surrounding package of assemblies.

Finally, for the secure and correct assembly of such struts it is usually necessary to provide an all-round annular groove on the end of the strut in the threaded area, so as to ensure a defined axial position of the clamping collar when it is fitted. The formation of both the axial slot and the annular groove not only weaken the end of the strut, but also require additional working steps for their production, and therefore incur corresponding machining costs.

SUMMARY OF THE INVENTION

Against that background, the purpose of the present invention is to provide a clamping assembly for a strut element, which overcomes the limitations and disadvantages that exist in the prior art. The clamping assembly according to the invention should connect the strut and the threaded bolt of the strut element securely and firmly, without weakening the strut structure or creating areas prone to corrosion attack. Furthermore, the clamping assembly according to the invention should occupy minimum structural space, it should be easy to assemble, and should be able to be produced with low production costs.

Firstly, in a manner known per se the clamping assembly is part of a strut element for the coupling connection of assemblies or components, and comprises an end zone of a substantially tubular strut and a threaded bolt for connection to the tubular strut.

According to the invention, however, the clamping assembly is distinguished by a threaded sleeve arranged in the end zone of the tubular strut, in a radial annular gap between the threaded bolt and the inside cross-section of the strut. The threaded sleeve has a conical external thread and an internal thread that fits the thread of the threaded bolt, and is designed to be radially elastic at least in the area of its end that extends into the strut. The end of the strut has a conical internal thread that fits the external thread of the threaded sleeve.

Thus, the clamping assembly according to the invention enables the strut and the threaded bolt to be assembled together by virtue of a conical internal thread arranged at the end of the strut and, arranged therein, a threaded sleeve with a conical external contour. For this, by virtue of its internal thread, the threaded sleeve receives the threaded bolt of the strut element. The threaded bolt can then still first be screwed in the usual manner into the end of the strut—or into the threaded sleeve therein—up to the desired depth, so as in this way to adjust to the desired length of the strut element.

When the desired screw-in depth or the desired effective length of the strut element has been reached, the threaded sleeve arranged in the conical internal thread at the end of the strut is tightened. By virtue of the at least partial, radially elastic construction of the threaded sleeve at its strut-side end, and by virtue of the conical threads of the strut and the threaded sleeve, this produces a radial compression of the threaded sleeve and hence a frictional fixing of the threaded bolt relative to the tubular strut.

In other words, this means that thanks to the invention a firm connection between the strut and the threaded bolt can be formed, without the need for a slot at the end of the strut or for the use of a clamping collar. Thus, the weakening of the strut connected with the slot, and the corrosion-prone area created, are eliminated just as is the previously usual all-round groove at the end of the strut for fixing the clamping collar. With the elimination of the clamping collar, the fitting space required in the area of the strut's end is also substantially reduced and there is no longer any risk of collision with nearby components or assemblies, as there was with the previously usual clamping collars.

In this case the internal thread of the strut and the external thread of the threaded sleeve are preferably shaped as cone sections with the same cone angle. This allows the threads to be produced inexpensively and the threaded sleeve can first be screwed easily into the internal thread at the end of the strut, after which the threaded bolt is screwed into the threaded sleeve to the desired depth. Then, the radial deformation of the threaded sleeve takes place by tightening the threaded sleeve against the strut.

However, depending on the design and wall thicknesses or radial rigidity of the threaded sleeve and/or the strut, the cone angles of the strut's internal thread and of the sleeve's external thread can be designed to be slightly different. In this way it is possible, for example, to reduce or avoid a possible radial expansion of the strut's diameter at the extreme outer end of the strut, produced if the threaded sleeve is no longer radially elastic there—and any difficulty in tightening the threaded sleeve against the strut that results from this.

For the same reason a thread shape design that deviates slightly from the conical shape can be chosen for the external thread of the threaded sleeve and/or the internal thread of the strut. For example, the internal thread of the strut can be made conical and the external sleeve thread conical with a superimposed camber, in particular so as to avoid stress peaks when the threaded sleeve is tightened against the strut.

Moreover, the invention is realized regardless of the manner in which the radial elasticity of the threaded sleeve is produced, at least in the area of its end on the strut side. Preferably, however, for that purpose the threaded sleeve has at least one radial slot in the area of its strut-side end. Particularly preferably, in the area of its end on the strut side the threaded sleeve has a plurality of radial slots positioned uniformly around the circumference of the threaded sleeve. This does not interfere with the function of the external thread nor with that of the internal thread of the sleeve, while at the same time providing the radial compliance of the threaded sleeve required for the form-locked fixing of the threaded bolt into the end of the strut.

The axial length of the at least one radial slot in the threaded sleeve—or the length of the several radial slots distributed around the sleeve's circumference—is preferably more than half, and particularly preferably more than two-thirds of the overall axial length of the threaded sleeve. Since the radial slot or slots in the threaded sleeve cover(s) the greatest possible part of its length, the radial elasticity of the sleeve required for effective clamping of the threaded bolt in the end of the strut is ensured in an optimum manner.

According to further preferred embodiments of the invention the threaded sleeve has a flange area with at least one key face and the strut has a key zone with at least one key face. This facilitates the assembly of the clamping assembly and the tightening of the threaded sleeve against the strut, since the torque required for this can be applied by way of corresponding key faces on the threaded sleeve and/or on the strut.

In a further, particularly preferred embodiment of the invention a reinforcing ring is arranged on the outer circumference of the strut in its connection zone with the threaded sleeve. The purpose of the reinforcing ring positioned in the area of the conical internal thread at or near the end of the strut—particularly in the case of thin-walled struts—is to strengthen the strut end in the radial direction. Since when the threaded sleeve is tightened against the strut, owing to the conical threads of the strut and the threaded sleeve, a radial pressure is built up inwardly against the threaded bolt and outwardly against the wall of the strut, in the case of thin-walled struts, that pressure could otherwise result in undesired expansion of the strut's end, leading ultimately to loosening of the clamping assembly, whereas this is prevented by the reinforcing ring.

Against that background a further, preferred embodiment of the invention provides that the at least one key surface on the strut side is formed on the reinforcing ring. In this way—and again especially with thin-walled struts—any possible weakening of the strut by the formation of key surfaces is avoided since the key surfaces are not formed directly on the strut, but rather, on the reinforcing ring positioned on the strut, whose wall thickness is sufficient for this. To ensure the reliable transfer of torque from the reinforcing ring to the strut, the reinforcing ring can even, if necessary, be fixed on with material cohesion, for example by spot welds or the like.

In a further preferred embodiment of the invention, the thread pitches of the external and internal threads of the threaded sleeve are the same size. In this way, during the assembly of the clamping assembly the final tightening of the threaded sleeve against the strut can take place without, for this, changing the axial position of the threaded bolt relative to the strut. The prerequisite for this embodiment (but not for realizing the invention) is that the external and internal threads of the threaded sleeve must have the same thread pitch direction, namely both the external and internal threads of the threaded sleeve are right-hand threads or both are left-hand threads.

In a further embodiment of the invention the external thread and/or the internal thread of the threaded sleeve is/are provided with material-continuous screw retention means. Such means, which can in particular consist of a thread bonding adhesive, are applied between the threads of the strut and the threaded sleeve or between the threads of the threaded bolt and the threaded sleeve, and once hardened or polymerized, additionally prevents any undesired loosening of the threaded connection between the strut and the threaded sleeve and between the threaded bolt and the threaded sleeve.

In principle, the invention does not depend on the design and intended purpose of the strut element. However, it is particularly preferable for the threaded bolt to be part of a mounting component which is a constituent of the strut element. The mounting component, which serves to transfer force into the strut element or to connect the strut element to a component to be connected, can be in particular an elastomeric mounting or a ball joint. Thus, in such an embodiment the threaded bolt can be in particular an integrally attached part of a joint cup or a joint housing for a ball joint or an elastomeric joint.

In a further, particularly preferred embodiment of the invention, the clamping assembly is part of a chassis strut, for example a steering or track rod designed in particular for the coupling connection of chassis components. The basis for this embodiment is that the clamping assembly according to the invention can be used with particular advantage in the chassis area or the wheel suspension of motor vehicles, since there the decisive advantages of the invention, in particular the considerable saving of space, the improved corrosion resistance and the greatly reduced risk of colliding with nearby components, can be brought to bear particularly effectively.

BRIEF DESCRIPTION OF THE DRAWINGS

Below, the invention is explained in more detail with reference to drawings which illustrate only example embodiments, and which show.

DETAILED DESCRIPTION OF THE PREFERRED EMBODIMENTS

Figure 1:
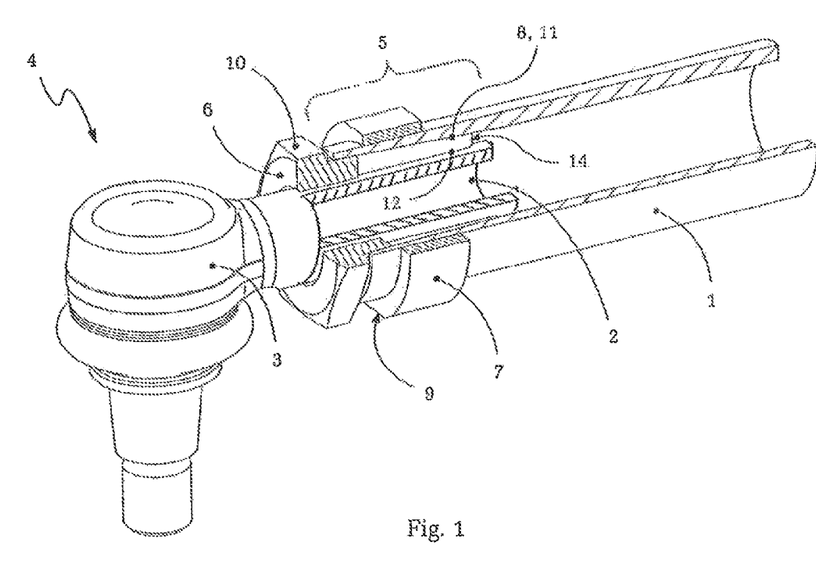
FIG. 1: A schematic, partially sectioned representation of the end area of a strut element with an embodiment of the clamping assembly according to the invention.

FIG. 1 shows the end area of a strut element in which an embodiment of the clamping assembly according to the invention is fitted. As parts of the strut element, the figure shows in particular the tubular strut 1 and the threaded bolt 2, which may be tubular and is fit into the end zone 5 thereof. In the embodiment illustrated, the threaded bolt 2 is an integrally attached part of the joint housing 3 of a ball joint 4.

Figures 4, 5:
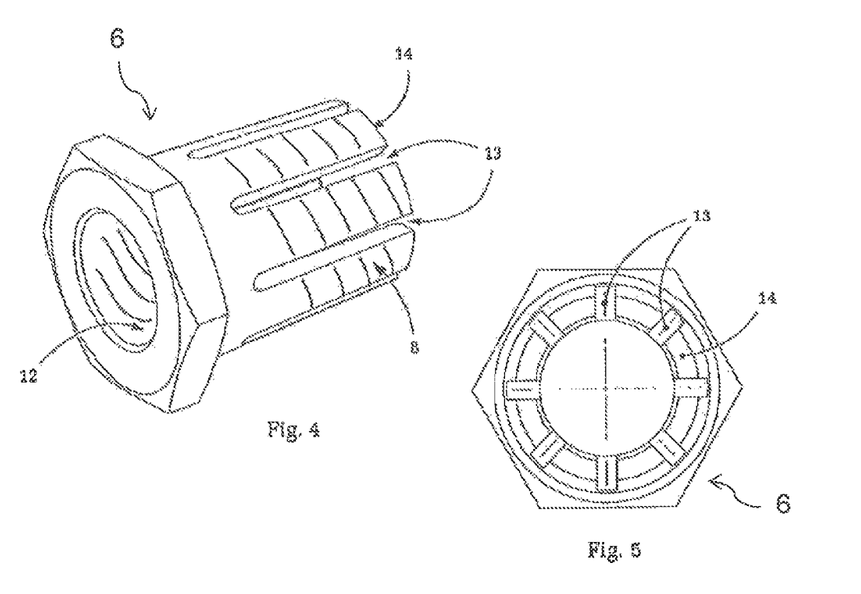
FIG. 4: An isometric representation of the threaded sleeve of the clamping assembly in FIGS. 1 to 3.
FIG. 5: The threaded sleeve of FIG. 4, viewed from the rear in relation to FIG. 4.

In a radial annular gap between the end zone 5 of the strut 1 and the threaded bolt 2, according to the invention there is fitted a threaded sleeve 6 with an internal thread 12 and an external thread 8. For the sake of greater clarity, the representations in FIGS. 1 and 5 do not specifically show the threads on the threaded bolt 2, the strut 1 and the threaded sleeve 6, and the representation in FIG. 4 diagrammatically shows the external threads 8 and the internal threads 12 of the threaded sleeve 6.

FIG. 1 also shows that a reinforcing ring 7 is located on the end zone 5 of the strut 1. In the embodiment of the clamping assembly illustrated, the reinforcing ring 7 serves, on the one hand, to strengthen radially the wall of the tubular strut 1 in its end zone 5 since in the joint area 5, by virtue of the conical external thread 8 on the threaded sleeve 6, when the clamping assembly 2, 5, 6 is tightened the wall of the strut is expanded or stressed outward, and in addition, in the area the wall thickness decreases toward the end of the strut. Another purpose of the reinforcing ring 7 in the embodiment illustrated is to provide the key surfaces 9 on the strut side, by virtue of which, during the tightening of the threaded sleeve 6, the strut 1 can be held steady relative to the key surfaces 10 of the sleeve.

Figure 2:
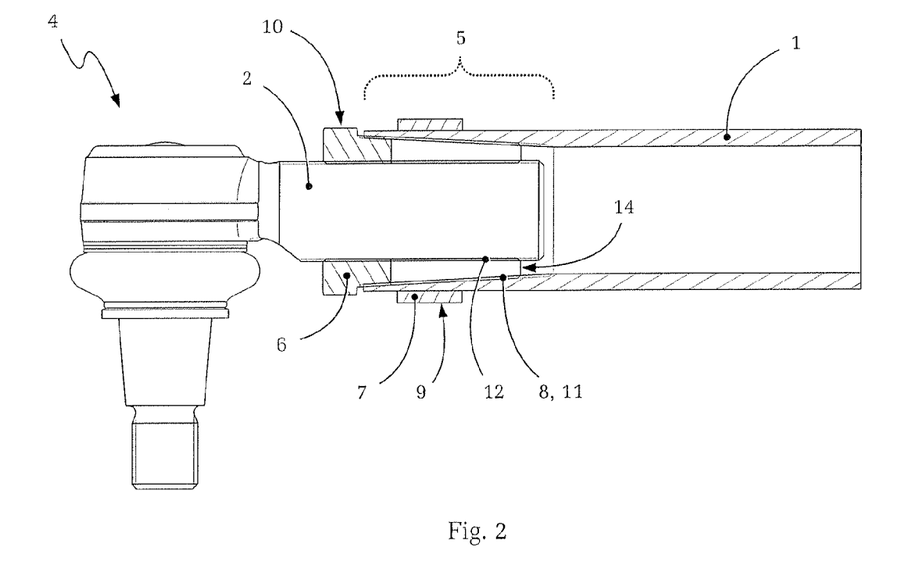
FIG. 2: A longitudinal section through the strut end and clamping assembly of the strut element shown in FIG. 1.

FIG. 2 shows the clamping assembly of FIG. 1, again viewed in longitudinal section. The figure shows the strut 1 with the reinforcing ring 7 on it, the threaded bolt 2 of the ball joint 4 and the threaded sleeve 6 arranged in the annular gap between the threaded bolt 2 and the tubular strut 1. On its outer circumference the threaded sleeve 6 has a conically shaped external thread 8, which in the connection area 5 is screwed into a matching, also conical internal thread 11 of the strut 1.

On its inner circumference, the threaded sleeve 6 has an internal thread 12, which is designed to match the cylindrical thread of the threaded bolt 2. To assemble the strut element, the threaded sleeve 6 is first screwed loosely into the conical internal thread 11 of the strut 1. Then, by means of the threaded bolt 2, the ball joint 4 can be screwed into the threaded sleeve 6 and thus also into the end of the strut 1, as far as the desired screw-in depth or until the required strut length has been reached. In this way, for example, in the case when the strut element is a steering or track rod, the track angle of an axle of a motor vehicle can be adjusted. The external thread 8 of the conical sleeve 6 then extends over the entire (conical) connection zone 5 of the threaded sleeve 6, while the internal thread 12 extends over the full length of the threaded sleeve 6.

Once the length of the strut element has been fixed in this way, the strut 1 and the threaded sleeve 6 are tightened against one another. For this, the strut 1 has the key surfaces (flat or linear segments) 9 formed on the reinforcing ring 7 and the threaded sleeve 6 has a collar with other key surfaces (flat or linear segments) 10. By tightening the strut 1 and the threaded sleeve 6, due to the conical design of the external thread 8 of the threaded sleeve 6 and of the internal thread 11 of the strut 1, the threaded sleeve 6 is radially compressed within the strut 1—particularly in the area of its end 14 on the strut side—whereby the internal thread 11 of the strut 1, the external thread 8 and the internal thread 12 of the threaded sleeve 6 and the thread on the threaded bolt 2 are all pressed radially against one another. This produces a firm, axially form-locked and, in the circumferential direction, friction-force locked connection between the threaded bolt 2 or bolt joint 4 and the strut 1.

Figure 3:
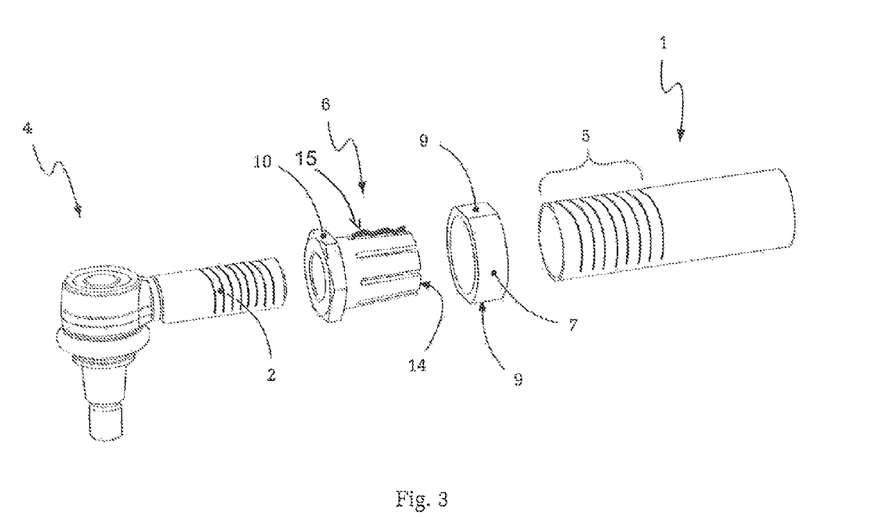
FIG. 3: An exploded view of the clamping assembly of the strut element shown in FIG. 1 and FIG. 2.

FIG. 3 again shows the clamping assembly represented as an assembly in FIGS. 1 and 2, but this time in an exploded view. This shows particularly clearly the slotting of the threaded sleeve 6 by virtue of which, in its connection zone 5 with the strut 1, the threaded sleeve 6 acquires the radial elasticity it needs in order to clamp the threaded bolt 2, the radial elasticity of the threaded sleeve 6 being most pronounced in the area of its end 14 on the strut side. The external thread 8 and/or the internal thread 12 of the threaded sleeve 6 may be provided with material-continuous screw retention means 15, which is only diagrammatically shown in FIG. 3.

In FIGS. 4 and 5, the threaded sleeve 6 is again shown, but on an enlarged scale. In FIGS. 4 and 5, again for the sake of greater simplicity the external thread 8 and the internal thread 12 of the threaded sleeve 6 are not represented explicitly in the drawing. One can see the radial slots 13 that extend over most of the length of the threaded sleeve 6. To illustrate the conical geometry of the threaded sleeve 6 more clearly, the rear end face 14 of the threaded sleeve 6 is shown, lightly shaded, in FIG. 5.

The clear result is that the invention provides a clamping assembly with which the strut and the threaded bolt of a strut element can be securely and lastingly connected firmly to one another, without any consequent weakening of the strut's structure due to the clamping assembly. Compared with the basic "strut" and "threaded bolt" components, the clamping assembly according to the invention needs almost no additional installation space, there is no need to form slots and/or grooves at the end of the strut that weaken the strut and create surfaces that are prone to corrosion, and the risk that exists in the prior art, of collision between a clamping collar in the area of the strut's end and adjacent components or assemblies is eliminated.

LIST OF INDEXES

1 Strut
2 Threaded blot
3 Joint housing
4 Ball joint
5 Connection zone
6 Threaded sleeve
7 Reinforcing ring
8 External thread of the sleeve
9, 10 Key faces
11 Internal thread of the strut
12 Internal thread of the sleeve
13 Radial slots
14 End face of the sleeve, end area of the sleeve

The invention claimed is:

1. A clamping assembly of a strut element for a coupling connection of assemblies or components, the clamping assembly comprising:
   an end area (5) of a substantially tubular strut (1), and a circumference of the tubular strut (1), in the end area (5), being continuous and uninterrupted so as to prevent expansion of the end area (5) of the tubular strut (1),
   a threaded bolt (2) having an external thread,
   a threaded sleeve (6) being received within the end area (5) of the strut (1) in a radial annular gap between the threaded bolt (2) and an internal surface of the strut (1), and the threaded sleeve having a conical external thread (8) and an internal thread (12) that corresponds to the thread of the threaded bolt (2), and the threaded sleeve has an axial first end (14) and an axial second end, the axial first end is on a strut side of the threaded sleeve and has one of a decreasing wall thickness and a decreasing external diameter,
   the end area of the strut (1) having a conical internal thread (11) that corresponds to the external thread (8) of the threaded sleeve (6), and
   the axial first end of the threaded sleeve (6) being radially elastic, and the axial second end being radially inelastic, the end area of the strut receives the axial first end and at least a portion of the axial second end of the threaded sleeve.

2. The clamping assembly according to claim 1, wherein at least one of the external thread (8) of the threaded sleeve (6) and the internal thread (11) of the strut (1) is designed in a shape of a cone section.

3. The clamping assembly according to claim 2, wherein cone angles of the internal thread (11) of the strut and cone angles of the external thread (8) of the threaded sleeve are the same size.

4. The clamping assembly according to claim 1, wherein the threaded sleeve (6) has, in an area of the axial first end (14) on the strut side, at least one radial slot (13).

5. The clamping assembly according to claim 4, wherein an axial length of the at least one radial slot (13) in the threaded sleeve (6) is longer than at least half of a length of the threaded sleeve (6).

6. The clamping assembly according to claim 1, wherein the threaded sleeve (6) has, in an area of the axial first end (14) on the strut side, a plurality of radial slots (13) distributed uniformly around a circumference thereof.

7. The clamping assembly according to claim 1, wherein the axial second end of the threaded sleeve (6) has a collar area with at least one key surface (10).

8. The clamping assembly according to claim 1, wherein the strut (1) has a key zone with at least one key surface (9).

9. The clamping assembly according to claim 8, wherein the at least one key surface (9) on the strut is located on a reinforcing ring (7) which circumscribes a circumference of the end area (5) of the strut (1).

10. The clamping assembly according to claim 1, wherein thread pitches of the external thread (8) and the internal thread (12) of the threaded sleeve (6) are the same.

11. The clamping assembly according to claim 1, wherein at least one of the external thread (8) and the internal thread (12) of the threaded sleeve is secured by material-continuous screw retention means.

12. The clamping assembly according to claim 1, wherein the threaded bolt (2) is part of a mounting component (4) of a strut element.

13. The clamping assembly according to claim 1, wherein the clamping assembly is part of either a steering rod or a track rod for a coupling connection of chassis components.

14. The clamping assembly according to claim 1, wherein an entirety of the axial first end on the strut side of the threaded sleeve is located radially within a cross-section of the strut and the axial second end is on an axially opposite side of the threaded sleeve, and a portion of the axial second end of the threaded sleeve projects out from the strut and is axially spaced therefrom.

15. The clamping assembly according to claim 1, wherein the threaded sleeve has a flange with at least one key face, and the flange has a larger diameter than an external diameter of the strut.

16. The clamping assembly according to claim 1, wherein the threaded sleeve has a key surface and the strut has a key surface, and the key surfaces of the threaded sleeve and the strut facilitate the assembly of the clamping assembly and tightening of the threaded sleeve against the strut.

17. The clamping assembly according to claim 1, wherein the threaded sleeve and the strut each have a key surface, and each key surface has a cross section whose perimeter has a plurality of linear segments allowing a key to engage the respective key surface and turn the respective threaded sleeve or the strut.

18. The clamping assembly according to claim 1, wherein
   the threaded bolt extends axially into the strut past the axial first end of the threaded sleeve;
   the threaded bolt projects axially from both the strut and the axial second end of the threaded sleeve; and
   a threaded portion of an internal surface of the threaded sleeve is axially spaced from the axial second end of the threaded sleeve that is axially opposite from the strut side of the threaded sleeve.

19. A clamping assembly of a strut element for a coupling connection of assemblies or components, the clamping assembly comprising:
   a threaded bolt (2) having an external thread,
   an end area (5) of a tubular strut (1) sized for receiving the threaded bolt (2) and a circumference of the tubular strut (1), in the end area (5), being continuous and uninterrupted so as to prevent expansion of the end area (5) when the threaded bolt (2) is received therein,
   a threaded sleeve (6) being threaded received within the end area (5) of the strut (1) in a radial annular gap between the threaded bolt (2) and an internal surface of the strut (1), and the threaded sleeve having a conical external thread (8) and an internal thread (12) that corresponds to the external thread of the threaded bolt (2), and the threaded sleeve has an axial first end (14), and an axial second end, the axial first end is on a strut side of the threaded sleeve and has one of a decreasing wall thickness and a decreasing external diameter, the end area of the strut (1) having a conical internal thread (11) that corresponds to the external thread (8) of the threaded sleeve (6), and the axial first end of the threaded sleeve (6) being designed to be radially elastic, and the axial second end of the threaded sleeve being radially inelastic, the end area of the strut receiving the axial first end and at least a portion of the axial second end of the threaded sleeve, and a continuous reinforcing ring (7) completely circumscribing an outer circumference of the strut (1) in a connection zone (5), and the reinforcing ring (7) reinforcing and preventing expansion of the end area (5) when the threaded bolt (2) and the threaded sleeve (6) are received within the end area (5) of the tubular strut (1).

20. A clamping assembly of a strut element for a coupling connection of assemblies or components, the clamping assembly comprising:

a threaded bolt having an external thread, a connection zone of an end area of a tubular strut being sized for receiving the threaded bolt with a radial annular gap being located therebetween, and a circumference of the connection zone, in the end area of the tubular strut, being continuous and uninterrupted so as to prevent expansion of the end area when the threaded bolt is received therein, a threaded sleeve being threaded received within the connection zone of the strut, in the radial annular gap between the threaded bolt and an internal surface of the strut, and the threaded sleeve having a conical external thread and an internal thread that corresponds to the external thread of the threaded bolt, and the threaded sleeve has an axial first end and an axial second end, the axial first end on a strut side of the threaded sleeve having one of a decreasing wall thickness and a decreasing external diameter, the connection zone of the strut having a conical internal thread that corresponds to the external thread of the threaded sleeve, the axial first end of the threaded sleeve being radially elastic, and the axial second end being radially inelastic, the end area of the strut receiving the axial first end and at least a portion of the axial second end of the threaded sleeve, and a continuous reinforcing ring being arranged on and completely circumscribing an outer circumference of the connection zone of the tubular strut, and the reinforcing ring reinforcing and preventing expansion of the connection zone of the tubular strut when the threaded bolt and the threaded sleeve are threadedly received within the connection zone of the tubular strut.

* * * * *